United States Patent
Akhssay

(10) Patent No.: US 9,965,578 B2
(45) Date of Patent: May 8, 2018

(54) COMPENSATION FOR PATTERNING DEVICE DEFORMATION

(71) Applicant: ASML NETHERLANDS B.V., Veldhoven (NL)

(72) Inventor: M'hamed Akhssay, Helmond (NL)

(73) Assignee: ASML NETHERLANDS B.V., Veldhoven (NL)

( * ) Notice: Subject to any disclaimer, the term of this patent is extended or adjusted under 35 U.S.C. 154(b) by 87 days.

(21) Appl. No.: 14/062,747

(22) Filed: Oct. 24, 2013

(65) Prior Publication Data

US 2014/0123082 A1 May 1, 2014

Related U.S. Application Data

(60) Provisional application No. 61/720,856, filed on Oct. 31, 2012.

(51) Int. Cl.
*G06F 17/50* (2006.01)

(52) U.S. Cl.
CPC ...... *G06F 17/5081* (2013.01); *G06F 2217/12* (2013.01); *Y02P 90/265* (2015.11)

(58) Field of Classification Search
CPC .......................... G03F 7/70216; G06F 17/5081
USPC .................................................... 716/100, 52
See application file for complete search history.

(56) References Cited

U.S. PATENT DOCUMENTS

| | | | |
|---|---|---|---|
| 5,229,872 A | 7/1993 | Mumola | |
| 5,296,891 A | 3/1994 | Vogt et al. | |
| 5,523,193 A | 6/1996 | Nelson | |
| 5,969,441 A | 10/1999 | Loopstra et al. | |
| 6,046,792 A | 4/2000 | Van Der Werf et al. | |
| 6,504,597 B2 | 1/2003 | Schuster et al. | |
| 6,835,511 B2 | 12/2004 | Hirayanagi | |
| 7,003,753 B2 | 2/2006 | Teene | |
| 7,092,231 B2 | 8/2006 | Hoeks et al. | |
| 7,187,433 B2 | 3/2007 | Ottens et al. | |

(Continued)

FOREIGN PATENT DOCUMENTS

| | | |
|---|---|---|
| DE | 10 2006 059 433 | 6/2008 |
| JP | H10-064790 | 3/1998 |
| KR | 10-2011-0081108 | 7/2011 |

OTHER PUBLICATIONS

Chris Spence, "Full-Chip Lithography Simulation and Design Analysis—How OPC is Changing IC Design," Proc. of SPIE, vol. 5751, pp. 1-14 (2005).

(Continued)

*Primary Examiner* — Suchin Parihar
(74) *Attorney, Agent, or Firm* — Pillsbury Winthrop Shaw Pittman LLP

(57) ABSTRACT

A method for improving a lithographic process for imaging a design layout onto a substrate using a lithographic projection apparatus comprising a patterning device, wherein the patterning device deforms from a first state to a second state, the method comprising: determining a deformation of the patterning device from the first state to the second state; determining a compensatory design layout from the design layout and the deformation; wherein the compensatory design layout is such that when the compensatory design layout is generated on the patterning device in the first state, the deformation of the patterning device deforms the compensatory design layout to the design layout.

20 Claims, 10 Drawing Sheets

(56) References Cited

U.S. PATENT DOCUMENTS

| | | | |
|---|---|---|---|
| 7,587,704 | B2 | 9/2009 | Ye et al. |
| 8,200,468 | B2 | 6/2012 | Ye et al. |
| 8,455,158 | B2 | 6/2013 | Tanabe |
| 2002/0005940 | A1* | 1/2002 | Hatada et al. .................. 355/55 |
| 2003/0003383 | A1* | 1/2003 | Van Der Werf .... G03F 7/70233 430/22 |
| 2004/0065848 | A1* | 4/2004 | Onishi et al. .............. 250/492.1 |
| 2004/0081898 | A1* | 4/2004 | Kamm et al. ..................... 430/5 |
| 2006/0033902 | A1* | 2/2006 | Latypov et al. ................ 355/67 |
| 2008/0299726 | A1* | 12/2008 | Ninomiya et al. ............ 438/270 |
| 2010/0062350 | A1* | 3/2010 | Abe et al. .......................... 430/5 |
| 2013/0024824 | A1* | 1/2013 | Huang et al. ................... 716/53 |
| 2013/0212543 | A1 | 8/2013 | Crouse et al. |

OTHER PUBLICATIONS

Yu Cao et al., "Optimized Hardware and Software for Fast, Full Chip Simulation," Proc. of SPIE, vol. 5754, pp. 407-414.

Alan E. Rosenbluth et al., "Optimum mask and source patterns to print a given shape," J. Microlith., Microfab., Microsyst., vol. 1, No. 1, pp. 13-30 (Apr. 2002).

Yuri Granik, "Source optimization for image fidelity and throughput," J. Microlith., Microfab., Microsyst., vol. 3, No. 4, pp. 509-522 (Oct. 2004).

U.S. Appl. No. 61/639,545, filed Apr. 27, 2012.

* cited by examiner

COMPENSATION FOR PATTERNING DEVICE DEFORMATION

CROSS REFERENCE TO RELATED APPLICATIONS

This application claims the benefit under 35 USC 119(e) of prior U.S. Provisional Patent Application No. 61/720,856, filed Oct. 31, 2012, the disclosure of which is hereby incorporated by reference in its entirety.

FIELD

The description herein relates to lithographic apparatuses and processes.

BACKGROUND

A lithographic projection apparatus can be used, for example, in the manufacture of integrated circuits (ICs). In such a case, a mask may contain a circuit pattern corresponding to at least a part of an individual layer of the IC ("design layout"), and this circuit pattern can be transferred onto a target portion (e.g. comprising one or more dies) on a substrate (e.g., silicon wafer) that has been coated with a layer of radiation-sensitive material ("resist"), by methods such as irradiating the target portion through the circuit pattern on the mask. In general, a single substrate contains a plurality of adjacent target portions to which the circuit pattern is transferred successively by the lithographic projection apparatus, one target portion at a time. In one type of lithographic projection apparatuses, the circuit pattern on the entire mask is transferred onto one target portion in one go; such an apparatus is commonly referred to as a wafer stepper. In an alternative apparatus, commonly referred to as a step-and-scan apparatus, a projection beam scans over the mask in a given reference direction (the "scanning" direction) while synchronously moving the substrate parallel or anti-parallel to this reference direction. Different portions of the circuit pattern on the mask are transferred to one target portion progressively. Since, in general, the lithographic projection apparatus will have a magnification factor M (generally <1), the speed F at which the substrate is moved will be a factor M times that at which the projection beam scans the mask. More information with regard to lithographic devices as described herein can be gleaned, for example, from U.S. Pat. No. 6,046,792, incorporated herein by reference.

A lithography process in which features with dimensions smaller than the classical resolution limit of a lithographic projection apparatus are printed, is commonly known as low-$k_1$ lithography, according to the resolution formula $CD=k_1 \times \lambda/NA$, where $\lambda$ is the wavelength of radiation employed (currently in most cases 248 nm or 193 nm), NA is the numerical aperture of projection optics in the lithographic projection apparatus, CD is the "critical dimension"—generally the smallest feature size printed—and $k_1$ is an empirical resolution factor. In general, the smaller $k_1$ the more difficult it becomes to reproduce a pattern on the wafer that resembles the shape and dimensions planned by a circuit designer in order to achieve particular electrical functionality and performance. To overcome these difficulties, sophisticated fine-tuning steps are applied to the lithographic projection apparatus as well as to the design layout. These include, for example, but not limited to, optimization of NA and optical coherence settings, customized illumination schemes, use of phase shifting masks, optical proximity correction (OPC, sometimes also referred to as "optical and process correction") in the design layout, or other methods generally defined as "resolution enhancement techniques" (RET).

As one example, OPC addresses the fact that the final size and placement of an image of the design layout projected on the substrate will not be identical to, or simply depend only on the size and placement of the design layout on the mask. It is noted that the terms "mask" and "reticle" are utilized interchangeably herein. Furthermore, masks and reticles can be broadly termed "patterning devices." Also, person skilled in the art will recognize that, especially in the context of lithography simulation/optimization, the term "mask" and "design layout" can be used interchangeably, as in lithography simulation/optimization, a physical mask is not necessarily used but a design layout can be used to represent a physical mask. For the small feature sizes and high feature densities present on some design layout, the position of a particular edge of a given feature will be influenced to a certain extent by the presence or absence of other adjacent features. These proximity effects arise from minute amounts of light coupled from one feature to another and/or non-geometrical optical effects such as diffraction and interference. Similarly, proximity effects may arise from diffusion and other chemical effects during post-exposure bake (PEB), resist development, and etching that generally follow lithography.

In order to ensure that the projected image of the design layout is in accordance with requirements of a given target circuit design, proximity effects need to be predicted and compensated for, using sophisticated numerical models, corrections or pre-distortions of the design layout. The article "Full-Chip Lithography Simulation and Design Analysis—How OPC Is Changing IC Design", C. Spence, Proc. SPIE, Vol. 5751, pp 1-14 (2005) provides an overview of current "model-based" optical proximity correction processes. In a typical high-end design almost every feature of the design layout requires some modification in order to achieve high fidelity of the projected image to the target design. These modifications may include shifting or biasing of edge positions or line widths as well as application of "assist" features that are intended to assist projection of other features. The assist features may include SRAF (Sub Resolution Assist Features) or PRAF (Printable Resolution Assist Features).

Application of model-based OPC to a target design requires good process models and considerable computational resources, given the many millions of features typically present in a chip design. However, applying OPC is generally not an "exact science," but an empirical, iterative process that does not always compensate for all possible proximity effect. Therefore, effect of OPC, e.g., design layouts after application of OPC and any other RET, need to be verified by design inspection, i.e. intensive full-chip simulation using calibrated numerical process models, in order to minimize the possibility of design flaws being built into the manufacturing of a mask. This is driven by the enormous cost of making high-end masks, which run in the multi-million dollar range, as well as by the impact on turn-around time by reworking or repairing actual masks once they have been manufactured.

Both OPC and full-chip RET verification may be based on numerical modeling systems and methods as described, for example in, U.S. patent application Ser. No. 10/815,573 and an article titled "Optimized Hardware and Software For Fast, Full Chip Simulation", by Y. Cao et al., Proc. SPIE, Vol. 5754, 405 (2005).

In addition to optimization to design layouts or masks (e.g., OPC), the illumination source can also optimized, either jointly with mask optimization or separately, in an effort to improve the overall lithography fidelity. Since the 1990s, many off-axis illumination sources, such as annular, quadrupole, and dipole, have been introduced, and have provided more freedom for OPC design, thereby improving the imaging results. As is known, off-axis illumination is a proven way to resolve fine structures (i.e., target features) contained in the mask. However, when compared to a traditional illumination source, an off-axis illumination source usually provides less light intensity for the aerial image (AI). Thus, it becomes desirable to attempt to optimize the illumination source to achieve the optimal balance between finer resolution and reduced light intensity. The terms "illumination source" and "source" are used interchangeably in this document.

Numerous illumination source optimization approaches can be found, for example, in an article by Rosenbluth et al., titled "Optimum Mask and Source Patterns to Print A Given Shape," Journal of Microlithography, Microfabrication, Microsystems 1(1), pp. 13-20, (2002). The source is partitioned into several regions, each of which corresponds to a certain region of the pupil spectrum. Then, the source distribution is assumed to be uniform in each source region and the brightness of each region is optimized for process window. However, such an assumption that the source distribution is uniform in each source region is not always valid, and as a result the effectiveness of this approach suffers. In another example set forth in an article by Granik, titled "Source Optimization for Image Fidelity and Throughput," Journal of Microlithography, Microfabrication, Microsystems 3(4), pp. 509-522, (2004), several existing source optimization approaches are overviewed and a method based on illuminator pixels is proposed that converts the source optimization problem into a series of non-negative least square optimizations. Though these methods have demonstrated some successes, they typically require multiple complicated iterations to converge. In addition, it may be difficult to determine the appropriate/optimal values for some extra parameters, such as γ in Granik's method, which dictates the trade-off between optimizing the source for wafer image fidelity and the smoothness requirement of the source.

During exposures, elements in the lithographic projection apparatus may deform. The deformations may be caused by many factors, such as radiation absorption, temperature change, mechanical movement, chemical reaction, etc. The deformations can contribute adversely to accurate projection of the design layout onto the substrate. Mechanisms that account or compensate for these deformations may be used to reduce or eliminate the adverse contribution. The deformations in the elements can be interdependent, which makes efforts to account or compensate for the deformations difficult.

In one example, the projection system may absorb radiation, heat-up and therefore introduce aberrations into the projection system, resulting in reduced image quality at substrate level. These effects are particularly acute when using illumination modes, such as dipole and quadrupole illuminations, and/or deep ultraviolet radiation (DUV), e.g. at 198, 157 or 126 nm, since the choice of materials from which lenses useable with these wavelengths can be made is generally limited and even the best materials have significant coefficients of absorption at those wavelengths. The problem particularly affects projection systems formed by refractive lens elements and is therefore often referred to as lens heating. Even with cooling systems that maintain the projection system at a constant temperature, sufficient local temperature variations can occur which can cause noticeable loss of imaging quality.

Therefore, many projection systems in lithographic projection apparatus are provided with one or more actuated adjustable elements whose shape, position and/or orientation in one or more degrees of freedom can be adjusted during or between exposures to compensate for lens heating effects. A computer model predicts the lens heating effects that are expected and calculates appropriate corrections to be effected by the adjustable elements. Computer models may be used to calculate the lens heating effects in terms of Zernike polynomials describing the aberrations in the pupil plane of the projection system and applied corrections via control "knobs" on the projection system that adjust one or more adjustable elements to give a correction corresponding to the relevant Zernike polynomial. Other attempts to deal with the problem of non-uniform lens heating include the provision of additional light sources, e.g. infra-red, to heat the "cold" parts, i.e. those not traversed by the intense parts of the projection beam, of elements of the projection system, see U.S. Pat. No. 6,504,597 and JP-A-08-221261. The former reference addresses non-uniform heating caused by a slit-shaped illumination field and the latter reference addresses non-uniform heating caused by zonal or modified illumination. The provision of such additional light sources and guides to conduct the additional heating radiation to the correct places may increase the complexity of the apparatus and the increased heat load in the projection system necessitates the provision of a cooling system of higher capacity.

Two approaches are conventionally pursued to account for lens heating effects.

In a first approach, which is used by lithography users to control lens heating issues in a production environment, the lens heating behavior is experimentally measured during a production lot. This empirically-generated lens heating data can then be used to calculate corrections which are applied to the projection system during a lot exposure. A series of lens actuators are available in the lithographic apparatus and can be used to move active elements, as the lens heats, that reduce the aberration signature through the production lot.

However, because the first approach is entirely driven by experiments, this requires that the lithographic apparatus be used during a significant amount of time to collect the lens heating data which are specific to the process under study. Moreover, in some circumstances, the lithographic apparatus does not have the dynamic range necessary to correct for the entire range of aberrations observed during production. Thus, limitations of the lithographic apparatus should also be considered for this empirically driven approach.

In a second approach, the expected lens heating signature is modeled through a simulation program (e.g. Tachyon Lens Heating Module). The simulations of the expected lens heating signature allow users to examine the predicted behavior of a proposed mask layout or pattern and identify the features that are most sensitive to lens heating-induced aberrations. Based on the predicted lens heating impact, the design can be iteratively modified to mitigate the most severe lens heating-induced aberrations. While time consuming and iterative in nature, this second approach is faster than the first approach which is driven entirely by lens heating experiments and lithographic apparatus controls. An example embodying the second approach can be found is commonly assigned U.S. Publication No. US-2013-0212543-A1, which is incorporated by reference in its entirety.

SUMMARY

Described herein is a method for improving a lithographic process for imaging a design layout onto a substrate using a lithographic projection apparatus comprising a patterning device, wherein the patterning device deforms from a first state to a second state, the method comprising: determining a deformation of the patterning device from the first state to the second state; determining a compensatory design layout from the design layout and the deformation; wherein the compensatory design layout is such that when the compensatory design layout is generated on the patterning device in the first state, the deformation of the patterning device deforms the compensatory design layout to the design layout.

BRIEF DESCRIPTION OF THE DRAWINGS

The above aspects and other aspects and features will become apparent to those ordinarily skilled in the art upon review of the following description of specific embodiments in conjunction with the accompanying figures, wherein.

DETAILED DESCRIPTION

Figure 1:
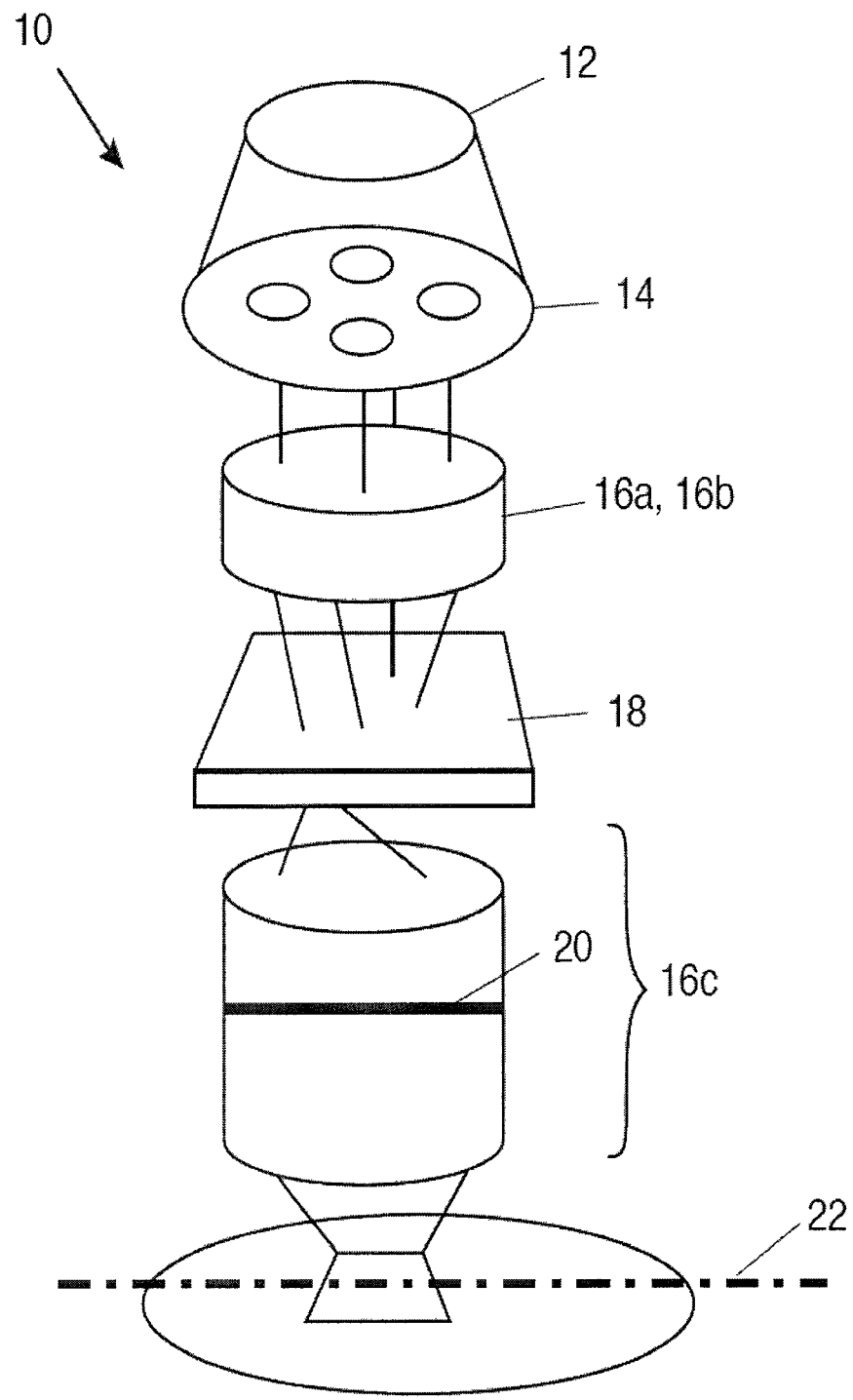
FIG. 1 is a block diagram of various subsystems of a lithography system according to an embodiment.

Embodiments will now be described in detail with reference to the drawings, which are provided as illustrative examples so as to enable those skilled in the art to practice the embodiments. Notably, the figures and examples below are not meant to limit the scope to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the embodiments will be described, and detailed descriptions of other portions of such known components will be omitted so as not to obscure the description of the embodiments. In the present specification, an embodiment showing a singular component should not be considered limiting; rather, the scope is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the scope encompasses present and future known equivalents to the components referred to herein by way of illustration.

Although specific reference may be made in this text to the use of the embodiments in the manufacture of ICs, it should be explicitly understood that the embodiments has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as interchangeable with the more general terms "mask", "substrate" and "target portion", respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range 5-20 nm).

The term "optimizing" and "optimization" as used herein mean adjusting a lithographic projection apparatus such that results and/or processes of lithography have more desirable characteristics, such as higher accuracy of projection of design layouts on a substrate, larger process windows, etc.

Further, the lithographic projection apparatus may be of a type having two or more substrate tables (and/or two or more mask tables). In such "multiple stage" devices the additional tables may be used in parallel, or preparatory steps may be carried out on one or more tables while one or more other tables are being used for exposures. Twin stage lithographic projection apparatuses are described, for example, in U.S. Pat. No. 5,969,441, incorporated herein by reference.

The mask referred to above comprise design layouts. The design layouts can be generated utilizing CAD (computer-aided design) programs, this process often being referred to as EDA (electronic design automation). Most CAD programs follow a set of predetermined design rules in order to create functional design layouts/masks. These rules are set by processing and design limitations. For example, design rules define the space tolerance between circuit devices (such as gates, capacitors, etc.) or interconnect lines, so as to ensure that the circuit devices or lines do not interact with one another in an undesirable way. The design rule limitations are typically referred to as "critical dimensions" (CD). A critical dimension of a circuit can be defined as the smallest width of a line or hole or the smallest space between two lines or two holes. Thus, the CD determines the overall size and density of the designed circuit. One of the goals in integrated circuit fabrication is to faithfully reproduce the original circuit design on the substrate (via the mask).

The term mask as employed in this text may be broadly interpreted as referring to generic patterning means that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning means include:

- a programmable mirror array. An example of such a device is a matrix-addressable surface having a viscoelastic control layer and a reflective surface. The basic principle behind such an apparatus is that (for example) addressed areas of the reflective surface reflect incident light as diffracted light, whereas unaddressed areas reflect incident light as undiffracted light. Using an appropriate filter, the said undiffracted light can be filtered out of the reflected beam, leaving only the diffracted light behind; in this manner, the beam becomes patterned according to the addressing pattern of the matrix-addressable surface. The required matrix addressing can be performed using suitable electronic means. More information on such mirror arrays can be gleaned, for example, from U.S. Pat. Nos. 5,296,891 and 5,523,193, which are incorporated herein by reference.
- a programmable LCD array. An example of such a construction is given in U.S. Pat. No. 5,229,872, which is incorporated herein by reference.

As a brief introduction, FIG. 1 illustrates an exemplary lithographic projection apparatus 10. Major components are an illumination source 12, which may be a deep-ultraviolet excimer laser source or other type of sources including extreme ultra violet (EUV) sources, illumination optics which define the partial coherence (denoted as sigma) and which may include optics 14, 16a and 16b that shape light from the source 12; a patterning device 18; and transmission optics 16c that project an image of the pattern on the patterning device onto a substrate plane 22. An adjustable filter or aperture 20 at the pupil plane of the projection optics may restrict the range of beam angles that impinge on the substrate plane 22, where the largest possible angle defines the numerical aperture of the projection optics NA=sin($\Theta_{max}$).

In an optimization process of a system, a figure of merit of the system can be represented as a cost function. The optimization process boils down to a process of finding a set of parameters (design variables) of the system that minimizes the cost function. The cost function can have any suitable form depending on the goal of the optimization. For example, the cost function can be weighted root mean square (RMS) of deviations of certain characteristics (evaluation points) of the system with respect to the intended values (e.g., ideal values) of these characteristics; the cost function can also be the maximum of these deviations. The term "evaluation points" herein should be interpreted broadly to include any characteristics of the system. The design variables of the system can be confined to finite ranges and/or be interdependent due to practicalities of implementations of the system. In case of a lithographic projection apparatus, the constraints are often associated with physical properties and characteristics of the hardware such as tunable ranges, and/or mask manufacturability design rules, and the evaluation points can include physical points on a resist image on a substrate, as well as non-physical characteristics such as dose and focus.

In a lithographic projection apparatus, a source provides illumination (i.e. light); projection optics direct and shapes the illumination through a mask and onto a substrate. The term "projection optics" is broadly defined here to include any optical component that may alter the wavefront of the radiation beam. For example, projection optics may include at least some of the components 14, 16a, 16b and 16c. An aerial image (AI) is the light intensity distribution on the substrate. A resist layer on the substrate is exposed and the aerial image is transferred to the resist layer as a latent "resist image" (RI) therein. The resist image (RI) can be defined as a spatial distribution of solubility of the resist in the resist layer. A resist model can be used to calculate the resist image from the aerial image, an example of which can be found in commonly assigned U.S. patent application Ser. No. 12/315,849, disclosure of which is hereby incorporated by reference in its entirety. The resist model is related only to properties of the resist layer (e.g., effects of chemical processes which occur during exposure, PEB and development). Optical properties of the lithographic projection apparatus (e.g., properties of the source, the mask and the projection optics) dictate the aerial image. Since the mask used in the lithographic projection apparatus can be changed, it is desirable to separate the optical properties of the mask from the optical properties of the rest of the lithographic projection apparatus including at least the source and the projection optics.

Figure 2:
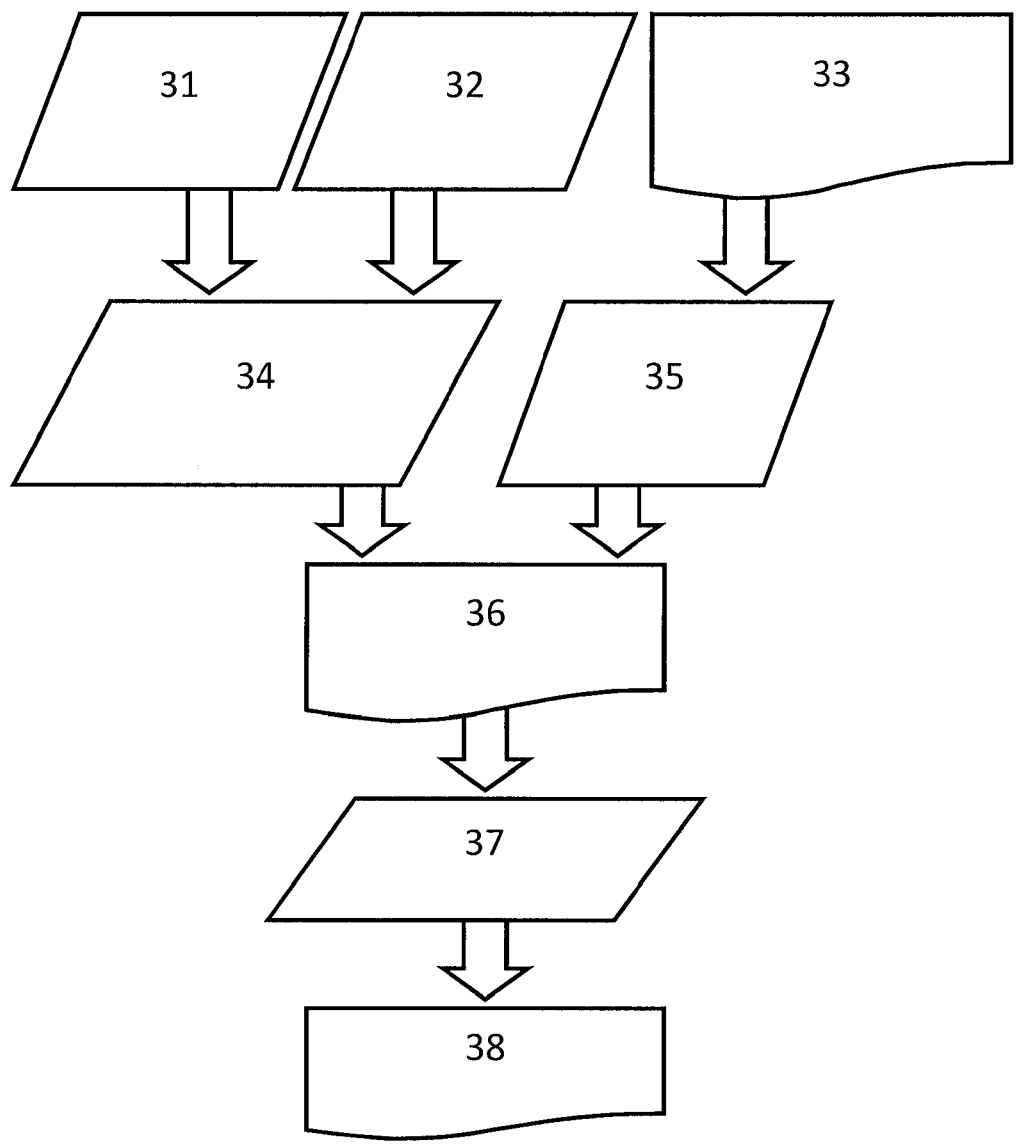
FIG. 2 is a block diagram of simulation models corresponding to the subsystems in FIG. 2.

An exemplary flow chart for simulating lithography in a lithographic projection apparatus is illustrated in FIG. 2. A source model 31 represents optical characteristics (including light intensity distribution and/or phase distribution) of the source. A projection optics model 32 represents optical characteristics (including changes to the light intensity distribution and/or the phase distribution caused by the projection optics) of the projection optics. The source model 31 and the projection optics model 32 can be combined into a transmission cross coefficient (TCC) model 34. A design layout model 35 represents optical characteristics (including changes to the light intensity distribution and/or the phase distribution caused by a given design layout 33) of a design layout 33, which is the representation of an arrangement of features on a mask. An aerial image 36 can be simulated from the transmission cross coefficient 34 and the design layout model 35. A resist image 38 can be simulated from the aerial image 36 using a resist model 37. Simulation of lithography can, for example, predict contours and CDs in the resist image.

More specifically, it is noted that the source model 31 can represent the optical characteristics of the source that include, but not limited to, NA-sigma (σ) settings as well as any particular illumination source shape (e.g. off-axis light sources such as annular, quadrupole, and dipole, etc.). The projection optics model 32 can represent the optical characteristics of the of the projection optics that include aberration, distortion, refractive indexes, physical sizes, physical dimensions, absorption, etc. The design layout model 35 can also represent physical properties of a physical mask, as described, for example, in U.S. Pat. No. 7,587,704, which is incorporated by reference in its entirety. The objective of the simulation is to accurately predict, for example, edge placements and CDs, which can then be compared against an intended design. The intended design is generally defined as a pre-OPC design layout which can be provided in a standardized digital file format such as GDSII or OASIS or other file format.

From this design layout, one or more portions may be identified, which are referred to as "clips". In a specific embodiment, a set of clips is extracted, which represents the complicated patterns in the design layout (typically about 50 to 1000 clips, although any number of clips may be used). As will be appreciated by those skilled in the art, these patterns or clips represent small portions (i.e. circuits, cells or patterns) of the design and especially the clips represent small portions for which particular attention and/or verification is needed. In other words, clips may be the portions of the design layout or may be similar or have a similar behavior of portions of the design layout where critical features are identified either by experience (including clips provided by a customer), by trial and error, or by running a full-chip simulation. Clips usually contain one or more test patterns or gauge patterns.

An initial larger set of clips may be provided a priori by a customer based on known critical feature areas in a design layout which require particular image optimization. Alternatively, in another embodiment, the initial larger set of clips may be extracted from the entire design layout by using some kind of automated (such as, machine vision) or manual algorithm that identifies the critical feature areas.

The projection system is not the only element subject to deformation. Another source of deformation may be the patterning device. In many lithographic projection apparatuses, the patterning device may be a reticle made of a glass substrate with metal (e.g., Cr) patterns representing the design layout generated on the glass substrate. For example, the metal patterns representing the design layout may be generated on the glass substrate by writing the design layout using a laser or electron beam onto a resist layer on the glass substrate, developing the resist layer, and subsequently etching a metal layer under the resist layer using the resist layer as a mask. The metal patterns and the glass substrate have very different absorption of the radiation from the source. This difference in absorption leads to spatial non-uniforminty in heating by the absorbed radiation. The patterning device may have a complex heat influx profile dependent on the metal patterns thereon and the illumination field of the source. Further complication may include heat diffusion within the glass substrate of the patterning device, the history of exposure of the patterning device in the radiation, heat transfer with the environment such as radiative and convective heat loss and conductive heat loss to holders of the patterning device. The patterning device may be held in place by holders such as a mechanical clamp or an electrostatic clamp. All these factors result in non-uniform thermal expansion of the patterning device. Thermal effect is only one possible source of deformation in the patterning device. Other sources may be the mechanisms by which the patterning device is held. For example, non-uniform force by the clamp may cause deformation in the patterning device. No matter what the source of the deformation is, the deformation of the patterning device leads to deformation of the design layout on the patterning device and less than accurate projection of the design layout onto a substrate.

In some lithographic apparatuses, deformation of the patterning device may be reduced or substantially eliminated using patterning device manipulators configured to controllably deform the patterning device at one or more locations to negate the effect of patterning device deformation caused by other factors. These manipulators can minimize aberration and control other user-specified litho metrics such as CD variations caused by patterning device heating. The effectiveness of these manipulators often depends on real time monitoring of the patterning device deformation and computationally expensive algorithms.

Figure 3:
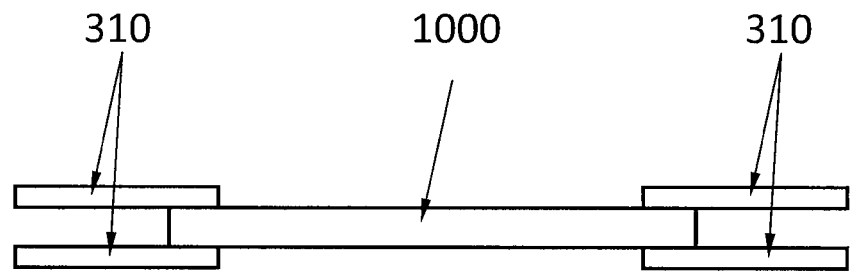
FIG. 3 shows a schematic of a patterning device held by clamps.

FIG. 3 shows a schematic of a patterning device 1000 held by clamps 310. The clamps 310 may be mechanical clamps or electrostatic clamps. Exemplary clamps are described in commonly assigned U.S. Pat. Nos. 7,092,231 and 7,187,433 and U.S. Patent Application Ser. No. 61/639,545, each of which is incorporated by reference in its entirety. The clamps 310 may affect thermally caused and mechanically caused deformation of the patterning device 1000.

Figure 4:
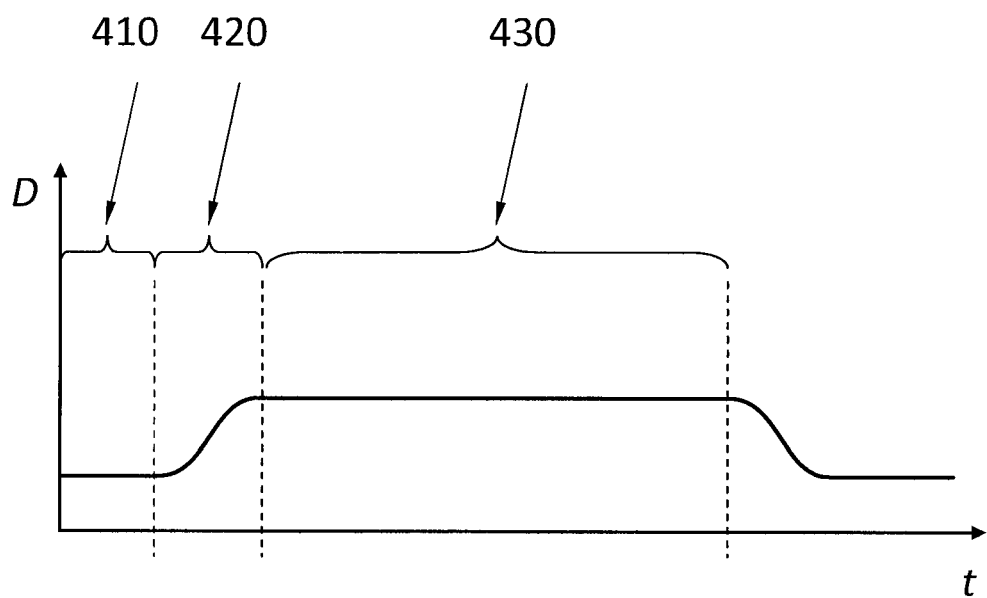
FIG. 4 schematically shows deformation of a patterning device as a function of time during exposure of a batch of substrates.

FIG. 4 schematically shows deformation of a patterning device as a function of time during exposure of a batch of substrates. The vertical axis is the deformation on the patterning device; the horizontal axis is time. In time period 410, the patterning device is not yet exposed to radiation from the source (i.e., the patterning device is in an undeformed state). As used herein, the term "undeformed state" means a state in which the patterning device is only subjected to a static deformation, if any, due to clamp and/or gravity, but not subject to deformation due to heat absorption from light source or deformation that may vary during the exposure. Exposure starts at the onset of time period 420. The deformation of the patterning device changes gradually during the time period 420, and reaches a stable state at the end of time period 420. Exposure continues in time period 430 and the deformation of the patterning device remains at the stable state.

The deformation in the stable state may not be exactly a constant but may have small fluctuations. For simplicity, the deformation in the stable state may be a time average of deformation in time period 430. The deformation in the stable state can be determined by measuring the actual deformation of the patterning device in a stable state. For example, the deformation in the stable state can be determined by measuring the displacement of markers (e.g., the three crosses in FIG. 6). The deformation in the stable state (also referred to as stable state deformation) can also be determined using any suitable model and algorithm such as finite element analysis. Parameters that may affect the stable state deformation include but are not limited to: intensity, distribution, and spectrum of the radiation source, geometric arrangement of the patterning device relative to the source, thermal environment in the lithographic projection apparatus, atmosphere around the patterning device, metal patterns on the patterning device, composition of the metal pattern, geometric shape of the patterning device, material of the patterning device, one or more patterning device manipulator wherein the one or more reticle manipulator is configured to controllably deform the patterning device at one or more locations, etc. In one embodiment, the deformation in the stable state can be calculated using the average absorption of the patterning device. Using the average absorption instead of using the specific design layout on the patterning device is a good approximation because of thermal diffusion in the patterning device.

Figure 5:
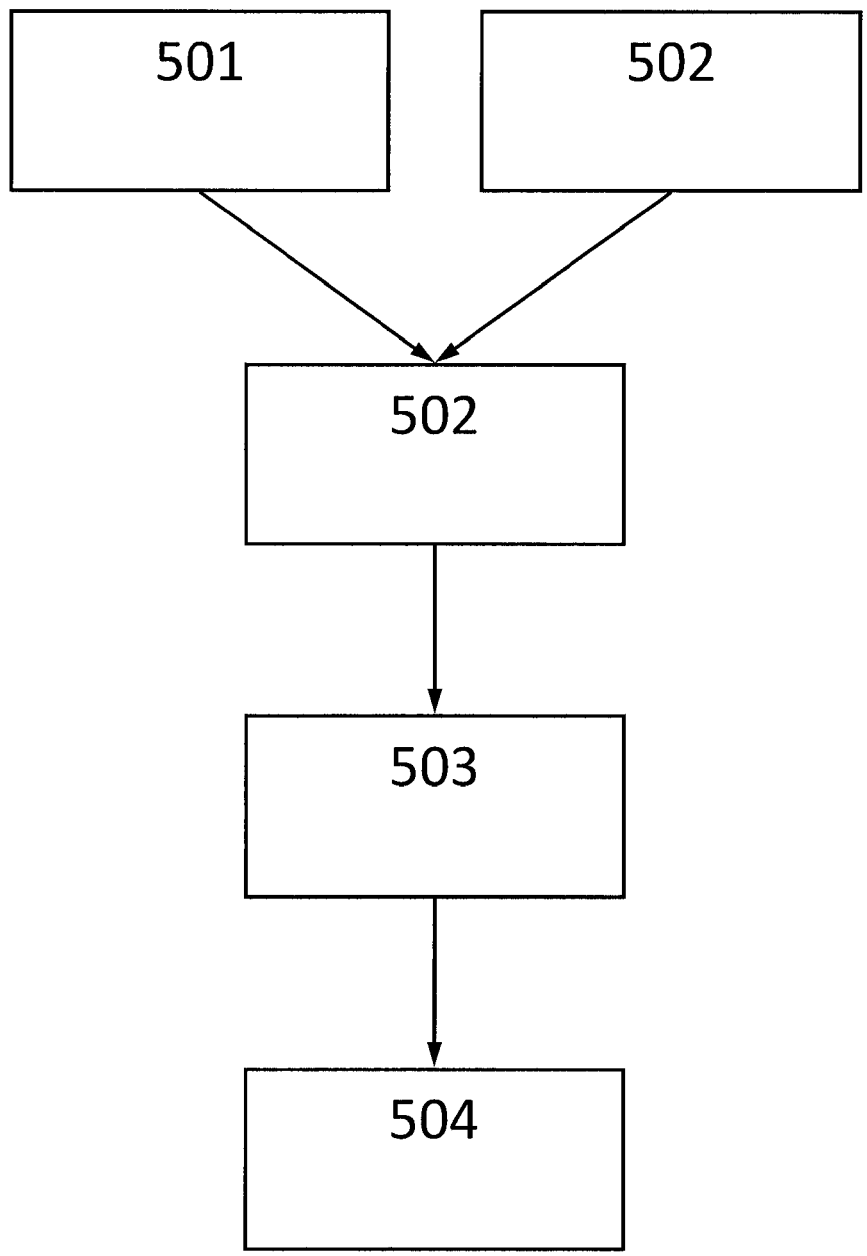
FIG. 5 shows a flow chart of a process to determine the compensatory design layout based on the design layout and the deformation of the patterning device.

After a deformation (e.g., the stable state deformation) of the patterning device is determined, a compensatory design layout can be determined from the design layout and the deformation of the patterning device. The compensatory design layout is such that when the compensatory design layout is generated on the patterning device in the undeformed state, the deformation of the patterning device deforms the compensatory design layout to the design layout. FIG. 5 shows a flow chart of this process. In step 501, the deformation (e.g., the stable state deformation) of the patterning device is determined. In step 502, the design layout is provided. In step 503, a compensatory design layout is determined from the deformation of the patterning device and the design layout. The compensatory design layout is such that when the compensatory design layout is generated on the patterning device in the undeformed state, the deformation of the patterning device deforms the compensatory design layout to the design layout. In step 504, the compensatory design layout is generated on the patterning device for exposure using the patterning device.

Figure 6:
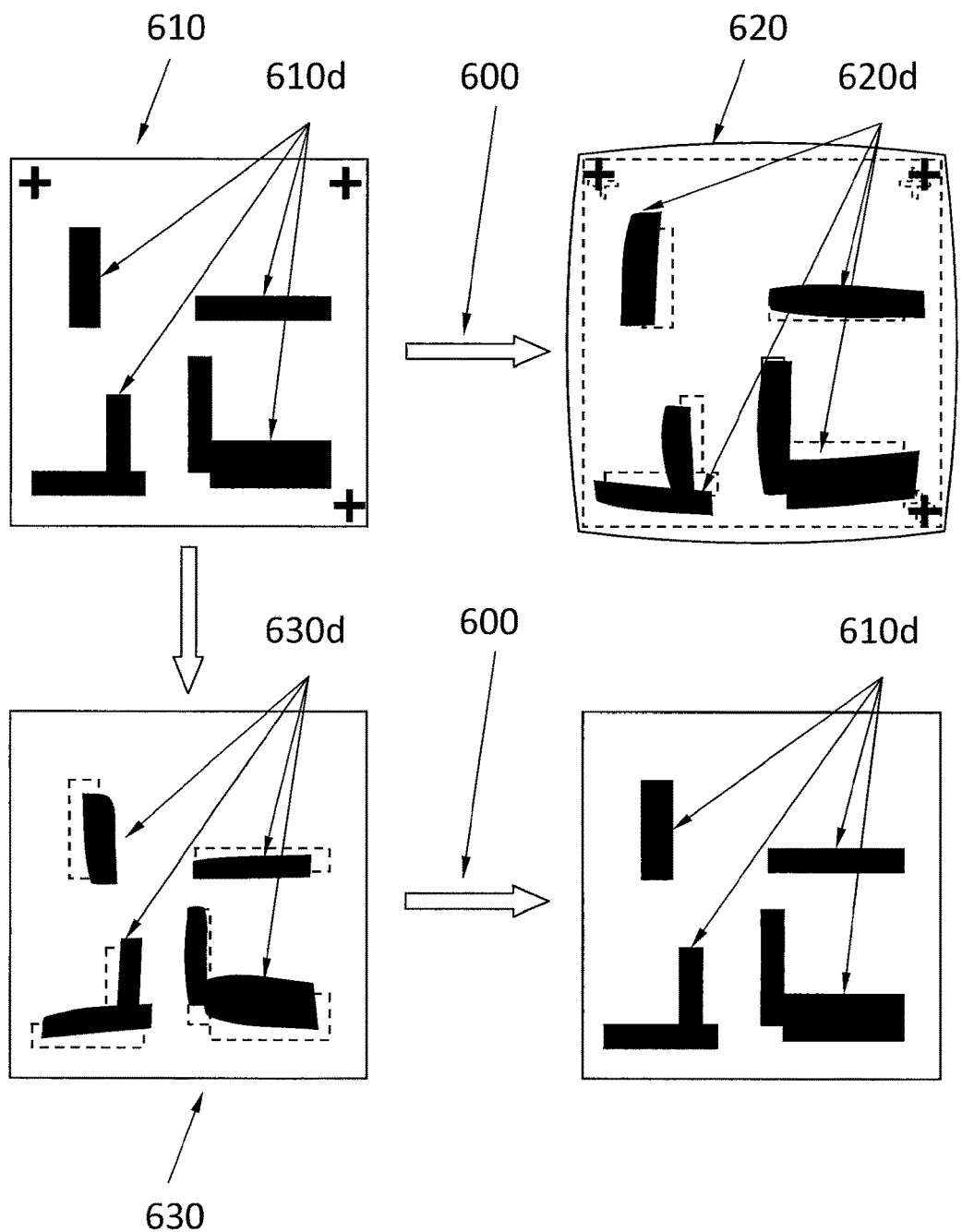
FIG. 6 illustrates the relationship among the deformation of the patterning device, the design layout and the compensatory design layout.

FIG. 6 further illustrates the relationship among the deformation of the patterning device, the design layout and the compensatory design layout. Under deformation 600 of the patterning device, undeformed patterning device 610 deforms into patterning device 620. Under the deformation 600 of the patterning device, design layout 610d deforms into a layout 620d. Underformed patterning device 610 and the design layout 620 are also depicted in dotted lines overlay on layout 620d. If undeformed patterning device 610 with design layout 610d is used in exposure, the design layout 610d will not be accurately transferred onto a substrate because the design layout 610d deforms into layout 620d. The compensatory design layout 630d is determined from the deformation 600 and the design layout 610d. When the compensatory design layout 630d is generated on patterning device 630 and when patterning device 630 undergoes the deformation 600, the compensatory design layout 630d deforms into the design layout 610d. If the patterning device 630 with the compensatory design layout 630d is used in exposure, the design layout 610d will be accurately transferred onto a substrate because the compensatory design layout 630d compensates for the deformation 600 of the patterning device.

Figure 7A:
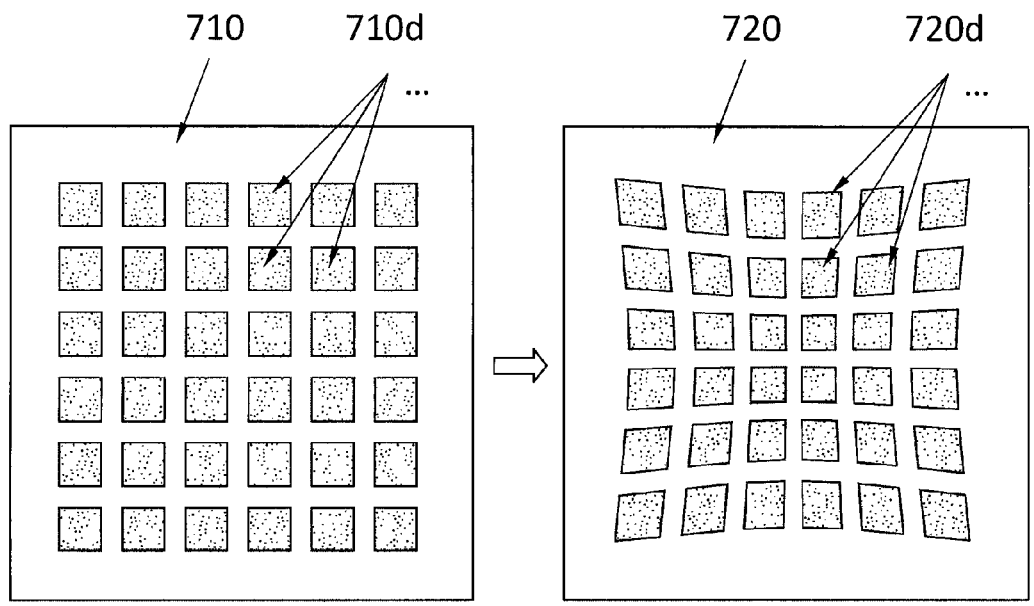
FIG. 7A and FIG. 7B show two approaches of determining the compensatory design layout from the design layout and the deformation, when the design layout comprises multiple dies.
Figure 7B:
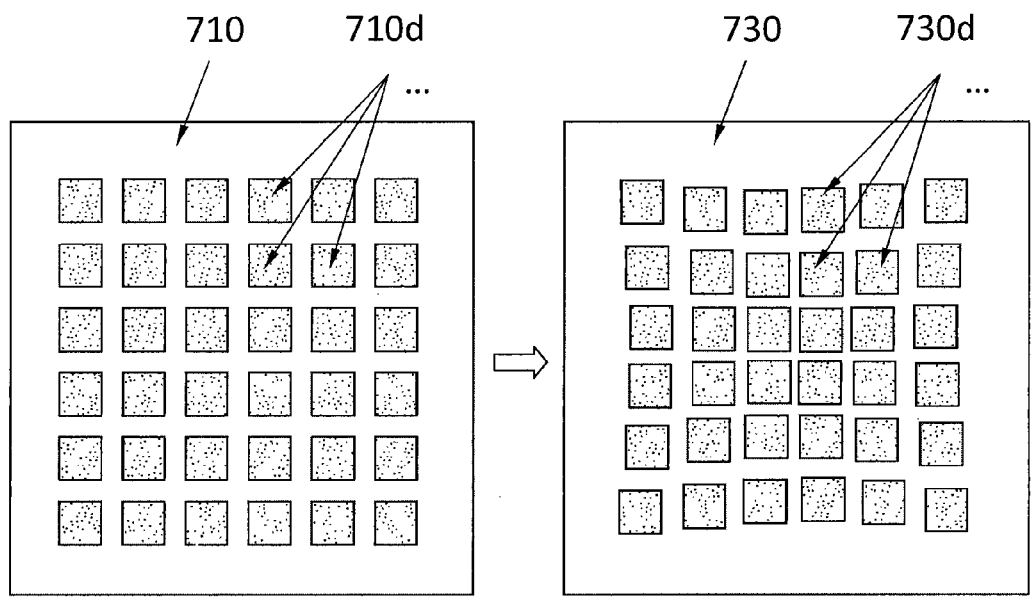

FIG. 7A and FIG. 7B show two approaches of determining the compensatory design layout from the design layout and the deformation, when the design layout comprises multiple dies. In FIG. 7A, compensatory design layout 720 comprises dies 720d corresponding to dies 710d of design layout 710. Dies 720d are not only displaced, but also deformed (e.g., skewed, scaled), with respect to corresponding dies 710d. Namely, patterns in dies 720d are not identical to patterns in corresponding dies 710d. In FIG. 7B, compensatory design layout 730 comprises dies 730d corresponding to dies 710d of design layout 710. Dies 730d are only displaced with respect to corresponding dies 710d. Namely, patterns in dies 730d are identical to patterns in corresponding dies 710d. The approach of FIG. 7A is more accurate but more computationally expensive than the approach of FIG. 7B. The approach of FIG. 7B is sufficient for most applications because deformation in the patterning device does not vary much within the area of individual dies.

Figure 8:
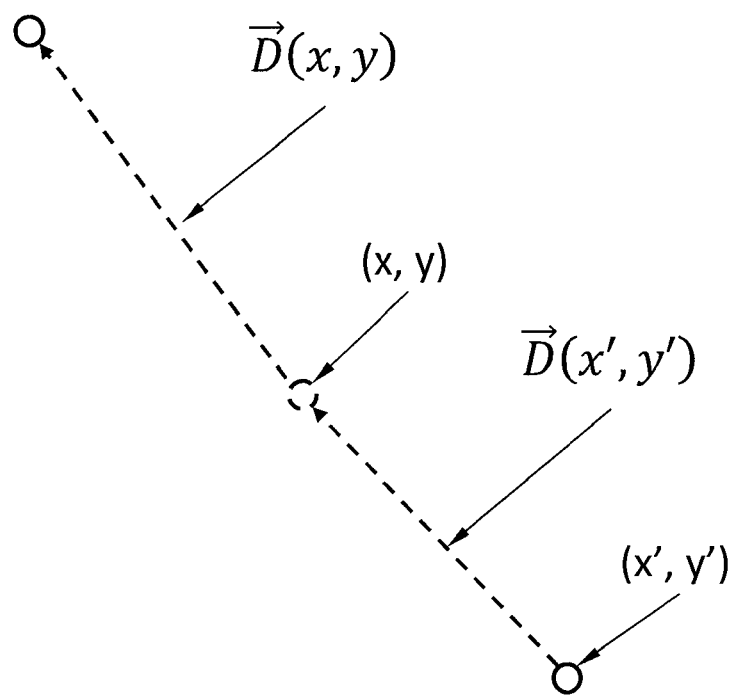
FIG. 8 shows a mathematical representation of the deformation and a general method of determining the compensatory design layout.

As shown in FIG. 8, deformation can be mathematically described by a vector field $\vec{D}(x,y)$, wherein (x, y) is a location on the design layout and $\vec{D}(x,y)$ is the displacement of location (x, y) under the deformation. The compensatory design layout is generally determined by determining for a location (x, y) on the design layout a location (x', y') on the compensatory design layout, wherein the location (x', y') satisfies the equation $$(x,y)=(x',y')+\vec{D}(x',y') \quad \text{(Eq. 1)}.$$

If the vector field $\vec{D}(x,y)$ is continuous, (x', y') that satisfies Eq. 1 always exists for each given (x, y).

The methods described herein may be applied to a design layout after OPC. Namely, after the design layout undergoes OPC, the design layout is generated in one or more dies on the patterning device. The patterning device is then compensated for deformation of the patterning device using the one of the methods described herein. Alternatively, if the location of the design layout on the patterning device is known before OPC, the methods described herein may be combined with OPC.

The methods described herein may replace or complement the patterning device manipulators. When the methods are used in complement with the patterning device manipulators, the adjustment range needed in the patterning device manipulators is reduced because the methods herein compensate for most of the deformation and the patterning device manipulators merely need to compensate any residue deformation such as fluctuation in the deformation.

Figure 9:
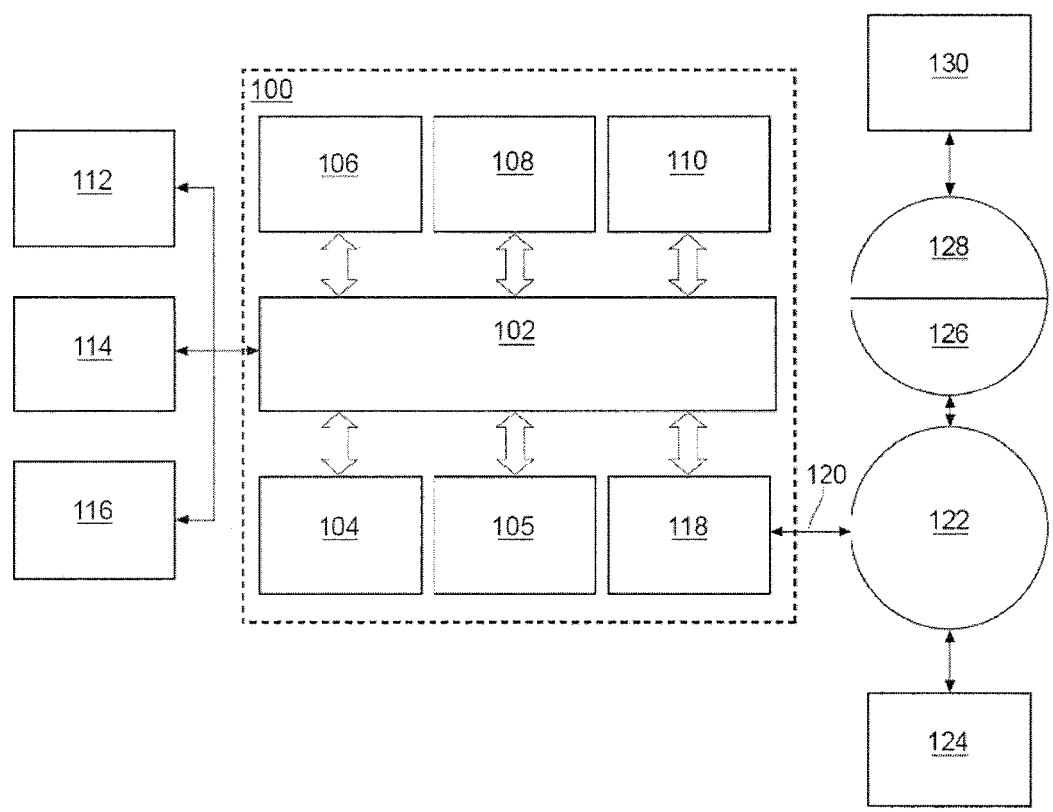
FIG. 9 is a block diagram of an example computer system in which embodiments can be implemented.

FIG. 9 is a block diagram that illustrates a computer system 100 which can assist in implementing the optimization methods and flows disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of the optimization process may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 may also include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with one or more embodiments, one such downloaded application provides for the illumination optimization of the embodiment, for example. The received code may be executed by processor 104 as it is received, and/or stored in storage device 110, or other non-volatile storage for later execution. In this manner, computer system 100 may obtain application code in the form of a carrier wave.

Figure 10:
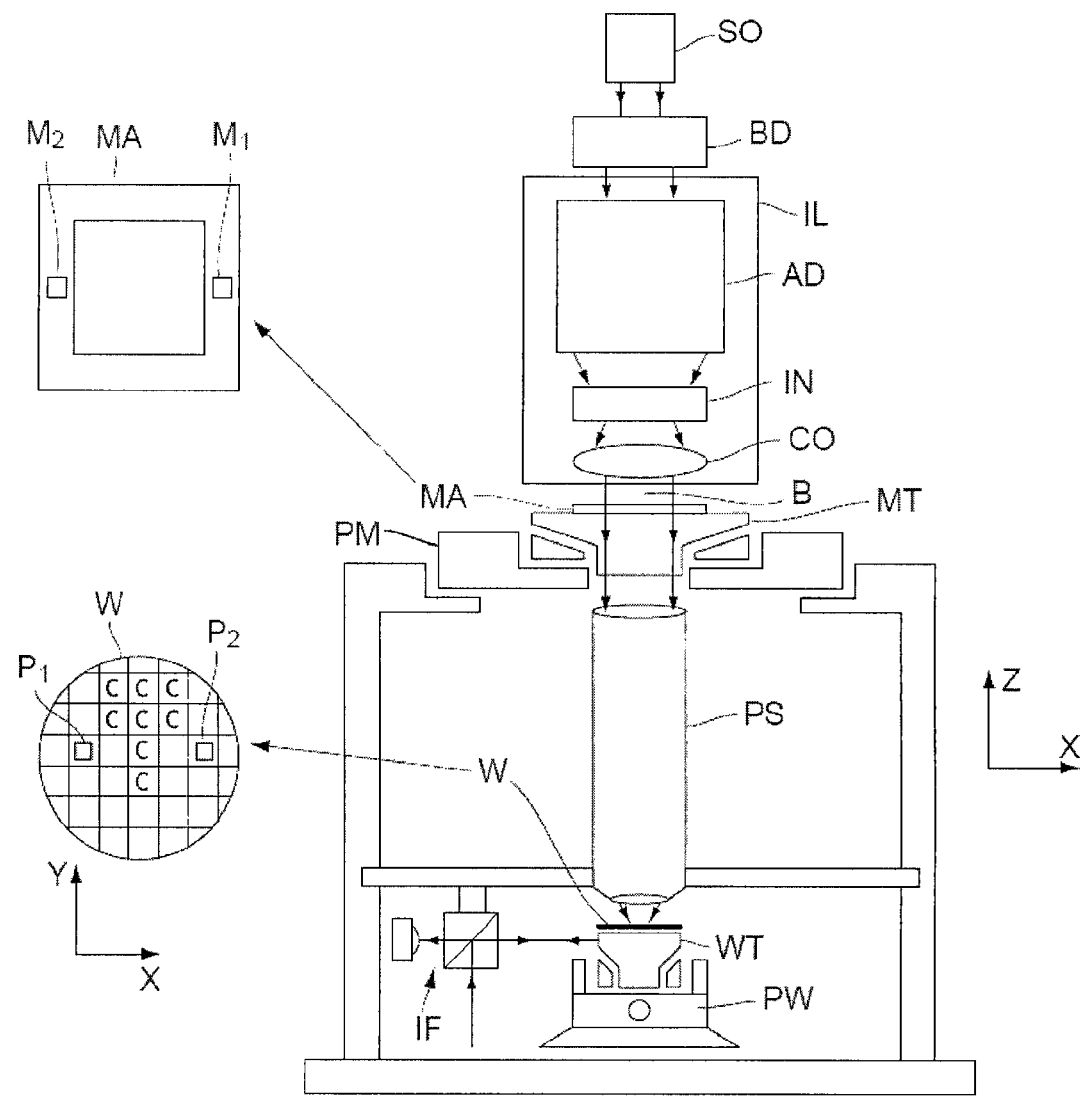
FIG. 10 is a schematic diagram of a lithographic projection apparatus to which embodiments are applicable.

FIG. 10 schematically depicts an exemplary lithographic projection apparatus whose illumination source could be optimized utilizing the methods described herein. The apparatus comprises:
- a radiation system IL, for supplying a projection beam B of radiation. In this particular case, the radiation system also comprises a radiation source SO;
- a first object table (mask table) MT provided with a mask holder for holding a patterning device MA (e.g., a mask or a reticle), and connected to first positioner for accurately positioning the mask with respect to item PS;
- a second object table (substrate table) WT provided with a substrate holder for holding a substrate W (e.g., a resist-coated silicon wafer), and connected to second positioner for accurately positioning the substrate with respect to item PS;
- a projection system ("lens") PS (e.g., a refractive, catoptric or catadioptric optical system) for imaging an irradiated portion of the patterning device MA onto a target portion C (e.g., comprising one or more dies) of the substrate W.

As depicted herein, the apparatus is of a transmissive type (i.e., has a transmissive mask). However, in general, it may also be of a reflective type, for example (with a reflective mask). Alternatively, the apparatus may employ another kind of patterning device as an alternative to the use of a mask; examples include a programmable mirror array or LCD matrix. If the patterning device is a programmable mirror array, a design layout may be generated thereon by directing the individual mirrors in the array such that the design layout can be imaged. If the patterning device is an LCD matrix, a design layout may be generated thereon by directing the individual pixels in the matrix such that the design layout can be imaged. In general, a design layout may be generated on a patterning device using any methods or tools suitable for the patterning device, which enable a lithography imaging tool to image the design layout.

The source SO (e.g., a mercury lamp or excimer laser) produces a beam of radiation. This beam is fed into an illumination system (illuminator) IL, either directly or after having traversed a conditioner, such as a beam expander BD, for example. The illuminator IL may comprise an adjuster AD for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam B impinging on the mask MA has a desired uniformity and intensity distribution in its cross-section.

It should be noted with regard to FIG. 10 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors); this latter scenario is often the case when the source SO is an excimer laser (e.g., based on KrF, ArF or $F_2$ lasing).

The beam B subsequently intercepts the patterning device MA, which is held on a patterning device table MT. Having traversed the patterning device MA, the beam B passes through the lens PL, which focuses the beam B onto a target portion C of the substrate W. With the aid of the second positioner (and interferometric measuring device IF), the substrate table WT can be moved accurately, e.g. so as to position different target portions C in the path of the beam B. Similarly, the first positioner can be used to accurately position the patterning device MA with respect to the path of the beam B, e.g., after mechanical retrieval of the patterning device MA from a patterning device library, or during a scan. In general, movement of the object tables MT, WT will be realized with the aid of a long-stroke module (coarse positioning) and a short-stroke module (fine positioning), which are not explicitly depicted in FIG. 9. However, in the case of a wafer stepper (as opposed to a step-and-scan tool) the patterning device table MT may just be connected to a short stroke actuator, or may be fixed.

The depicted tool can be used in two different modes:

- In step mode, the patterning device table MT is kept essentially stationary, and an entire patterning device image is projected in one go (i.e., a single "flash") onto a target portion C. The substrate table WT is then shifted in the x and/or y directions so that a different target portion C can be irradiated by the beam B;
- In scan mode, essentially the same scenario applies, except that a given target portion C is not exposed in a single "flash". Instead, the patterning device table MT is movable in a given direction (the so-called "scan direction", e.g., the y direction) with a speed v, so that the projection beam B is caused to scan over a patterning device image; concurrently, the substrate table WT is simultaneously moved in the same or opposite direction at a speed V=Mv, in which M is the magnification of the lens PS (typically, M=¼ or ⅕). In this manner, a relatively large target portion C can be exposed, without having to compromise on resolution.

The concepts disclosed herein may simulate or mathematically model any generic imaging system for imaging sub wavelength features, and may be especially useful with emerging imaging technologies capable of producing wavelengths of an increasingly smaller size. Emerging technologies already in use include EUV (extreme ultra violet) lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

The invention may further be described using the following clauses:

1. A method for improving a lithographic process for imaging a design layout onto a substrate using a lithographic projection apparatus comprising a patterning device, wherein the patterning device deforms from a first state to a second state, the method comprising:

determining a deformation of the patterning device from the first state to the second state;

determining a compensatory design layout from the design layout and the deformation;

wherein the compensatory design layout is such that when the compensatory design layout is generated on the patterning device in the first state, the deformation of the patterning device deforms the compensatory design layout to the design layout.

2. The method of Clause 1, further comprising generating the compensatory design layout on the patterning device.

3. The method of Clause 1, wherein the design layout comprises one or more dies and the compensatory design layout comprises one or more dies corresponding to the one or more dies of the design layout.

4. The method of Clause 3, wherein the one or more dies of the compensatory design layout are displaced with respect of the one or more dies of the design layout to which the one or more dies of the compensatory design layout correspond.

5. The method of Clause 3, wherein the one or more dies of the compensatory design layout are deformed with respect of the one or more dies of the design layout to which the one or more dies of the compensatory design layout correspond.

6. The method of Clause 5, wherein the one or more dies of the compensatory design layout are deformed by skewing, scaling or a combination thereof.

7. The method of Clause 1, wherein determining the compensatory design layout comprises determining for a location on the design layout a location on the compensatory design layout, wherein the location on the compensatory design layout displaces to the location on the design layout under the deformation.

8. The method of Clause 1, wherein the deformation is a continuous vector field.

9. The method of Clause 1, wherein the deformation is affected by the group consisting of intensity, distribution, and spectrum of a radiation source of the lithographic projection apparatus, geometric arrangement of the reticle relative to the radiation source, thermal environment in the lithographic projection apparatus, atmosphere around the patterning device, metal patterns on the patterning device, composition of the metal pattern, geometric shape of the patterning device, material of the patterning device, one or more patterning device manipulator, wherein the one or more reticle manipulator is configured to controllably deform the patterning device at one or more locations, and a combination thereof.

10. The method of Clause 1, further comprising conducting optical proximity correction of the design layout.

11. The method of Clause 1, wherein the lithographic projection apparatus further comprises one or more patterning device manipulator, wherein the one or more patterning device manipulator is configured to controllably deform the patterning device at one or more locations.

12. The method of Clause 1, wherein the design layout comprises at least one assist feature.

13. The method of Clause 12, wherein the at least one assist feature comprises a SRAF (Sub Resolution Assist Feature) and/or PRAF (Printable Resolution Assist Feature).

14. The method of Clause 1, wherein the design layout comprises one or more markers and wherein the stable state deformation is determined by measuring displacement of the markers.

15. The method of Clause 1, wherein the deformation is determined by modeling.

16. The method of Clause 15, wherein the modeling is finite element analysis.

17. The method of Clause 1, wherein the deformation is a stable state deformation during exposure of a batch of substrates using the lithographic projection apparatus.

18. A computer program product comprising a computer readable medium having instructions recorded thereon, the instructions when executed by a computer implementing the method of any of the above clauses.

The descriptions above are intended to be illustrative, not limiting. Thus, it will be apparent to one skilled in the art that modifications may be made to the embodiments as described without departing from the scope of the claims set out below.

What is claimed is:

1. A method for improving a lithographic process for imaging a design layout onto a substrate using a lithographic projection apparatus comprising a patterning device, wherein the patterning device deforms from a first state to a second state, the method comprising:
   determining a deformation of the patterning device from the first state to the second state, wherein the patterning device comprises a lithographic mask;
   determining a compensatory design layout from the design layout and the deformation of the patterning device;
   wherein the compensatory design layout is such that when the compensatory design layout is generated on the patterning device in the first state, the deformation of the patterning device deforms the compensatory design layout to the design layout.

2. The method of claim 1, further comprising generating the compensatory design layout on the patterning device.

3. The method of claim 1, wherein the design layout comprises one or more dies and the compensatory design layout comprises one or more dies corresponding to the one or more dies of the design layout.

4. The method of claim 3, wherein the one or more dies of the compensatory design layout are displaced with respect to the one or more dies of the design layout to which the one or more dies of the compensatory design layout correspond.

5. The method of claim 3, wherein the one or more dies of the compensatory design layout are deformed with respect to the one or more dies of the design layout to which the one or more dies of the compensatory design layout correspond.

6. The method of claim 5, wherein the one or more dies of the compensatory design layout are deformed by skewing, scaling or a combination thereof.

7. The method of claim 1, wherein determining the compensatory design layout comprises determining for a location on the design layout a location on the compensatory design layout, wherein the location on the compensatory design layout displaces to the location on the design layout under the deformation.

8. The method of claim 1, wherein the deformation is a continuous vector field.

9. The method of claim 1, wherein the deformation is affected by one or more selected from the group consisting of intensity, distribution, and spectrum of a radiation source of the lithographic projection apparatus, geometric arrangement of the patterning device relative to a radiation source, thermal environment in the lithographic projection apparatus, atmosphere around the patterning device, metal patterns on the patterning device, composition of a metal pattern on the patterning device, geometric shape of the patterning device, material of the patterning device, one or more patterning device manipulators configured to controllably deform the patterning device at one or more locations, and a combination thereof.

10. The method of claim 1, wherein the lithographic projection apparatus further comprises one or more patterning device manipulators, wherein the one or more patterning device manipulators are configured to controllably deform the patterning device at one or more locations.

11. The method of claim 1, wherein the design layout comprises at least one assist feature.

12. The method of claim 1, wherein the design layout comprises one or more markers and wherein the deformation is determined by measuring displacement of the one or more markers.

13. The method of claim 1, wherein the deformation is determined by modeling.

14. The method of claim 1, wherein the deformation is a stable state deformation during exposure of a batch of substrates using the lithographic projection apparatus.

15. A computer program product comprising a computer readable medium having instructions recorded thereon for improving a lithographic process for imaging a design layout onto a substrate using a lithographic projection apparatus comprising a patterning device, wherein the patterning device deforms from a first state to a second state, the instructions when executed by a computer configured to cause at least:
   determination of a deformation of the patterning device from the first state to the second state, wherein the patterning device comprises a lithographic mask; and
   determination of a compensatory design layout from the design layout and the deformation of the patterning device,
   wherein the compensatory design layout is such that when the compensatory design layout is generated on the patterning device in the first state, the deformation of the patterning device deforms the compensatory design layout to the design layout.

16. The method of claim 1, wherein the first state comprises a first set of physical dimensions of the patterning device and the second state comprises a second set of physical dimensions different than the first set of physical dimensions.

17. The method of claim 1, wherein the deformation is caused by heating of the patterning device from a first temperature associated with the first state to a second higher temperature associated with the second state.

18. The method of claim 16, wherein the deformation is caused by heating of the patterning device from a first temperature associated with the first state to a second higher temperature associated with the second state.

19. The method of claim 1, wherein the deformation is caused by mechanisms by which the patterning device is held within the lithographic projection apparatus.

20. The method of claim 1, wherein the patterning device comprises a glass substrate.

* * * * *